(12) United States Patent
Bonneau et al.

(10) Patent No.: US 6,310,108 B1
(45) Date of Patent: Oct. 30, 2001

(54) PROCESS FOR SYNTHESIS AT ATMOSPHERIC DISTILLATE THAT COMPRISES THE USE OF FISCHER-TROPSCH TECHNOLOGY

(75) Inventors: Reynald Bonneau, Villeurbanne (FR); Mario-Gabriele Clerici, Milan (IT); Jean-Charles Viltard, Vienne (FR)

(73) Assignees: Institut Francais du Petrole, Rueil-Malmaison Cedex (FR); ENI S.p.A.; AGIP Petroli S.p.A., both of Rome (IT)

( * ) Notice: Subject to any disclaimer, the term of this patent is extended or adjusted under 35 U.S.C. 154(b) by 0 days.

(21) Appl. No.: 09/501,680

(22) Filed: Feb. 10, 2000

(30) Foreign Application Priority Data

Feb. 11, 1999 (FR) .................................................. 99 01676

(51) Int. Cl.$^7$ ............................ C07C 27/00; C07C 13/28; C07C 5/13; C10G 35/00; C10G 25/00
(52) U.S. Cl. ........................... 518/700; 518/702; 518/703; 518/704; 208/46; 208/133; 208/308; 585/352; 585/734
(58) Field of Search .................................... 518/760, 702, 518/703, 704; 208/46, 133, 308; 585/734, 352

(56) References Cited

U.S. PATENT DOCUMENTS 4,385,193   5/1983   Bijwaard et al. ..................... 585/310

FOREIGN PATENT DOCUMENTS

| 0 178 007 | 4/1986 | (EP) . |
| 0 512 635 | 11/1992 | (EP) . |
| 0 583 211 | 2/1994 | (EP) . |
| 2 183 672 | 6/1987 | (GB) . |
| WO 93/15999 | 8/1993 | (WO) . |

Primary Examiner—Paul J. Killos
Assistant Examiner—J. Parsa
(74) Attorney, Agent, or Firm—Millen, White, Zelano & Branigan, P.C.

(57) ABSTRACT

Production of atmospheric distillate from a hydrocarbon feedstock that comprises a stage for the formation of a gas mixture that contains hydrogen and carbon monoxide, an at least partial conversion stage of the gas mixture that is obtained so as to obtain a liquid effluent that contains hydrocarbons and a gas effluent that contains carbon dioxide, a stage for treating the gas effluent under conditions that make it possible to eliminate the carbon dioxide at least partly, a first stage of fractionation of the liquid fraction, an isomerizing hydrocracking stage in the presence of hydrogen and a second fractionation stage.

17 Claims, 2 Drawing Sheets

PROCESS FOR SYNTHESIS AT ATMOSPHERIC DISTILLATE THAT COMPRISES THE USE OF FISCHER-TROPSCH TECHNOLOGY

This invention relates to the synthesis of an atmospheric distillate from a hydrocarbon feedstock and often from a feedstock that contains hydrocarbon compounds and in particular from naphtha, natural gas or methane. Within the context of this description, the term atmospheric distillate refers to one or more fractions that basically contain liquid hydrocarbons under normal pressure at a temperature of about 20° C., i.e., compounds that have at least five carbon atoms in their molecule.

The process for synthesis of an atmospheric distillate according to this invention comprises the use of the Fischer-Tropsch technology that is incorporated in a comprehensive system that comprises the preparation of the synthesis gas from a liquid or gas hydrocarbon feedstock, and most often gas hydrocarbon feedstock. There are only very few industrial units that have been built and integrated into a comprehensive scheme for the production of atmospheric distillate. For example, the magazine Oil and Gas Journal describes in 1949 Vol. 47, pp. 248–250 the production done in Texas within the framework of the Carthage Hydrocol project.

As this is emphasized in particular in the description of Patent US-A-5 621 155, a very large number of problems is linked to the implementation of a comprehensive production system of atmospheric distillate that comprises the use of the Fischer-Tropsch technology. Thus, for example, the hydrocarbon feedstock that is used is converted into a gas mixture that is called synthesis gas that contains a mixture of carbon monoxide and hydrogen before this mixture is introduced into the Fischer-Tropsch reactor. Economic conditions for operating a Fischer-Tropsch reactor of a given size require obtaining for the gas mixture that is introduced into the reactor a hydrogen to carbon monoxide ratio in a well-established range. The implementation of the Hydrocol project uses partial oxidation of natural gas to form a gas mixture that contains a hydrogen to carbon monoxide ratio of about 2. Another approach for the formation of the gas mixture that contains hydrogen and carbon monoxide is the use of the technique for steam reforming of natural gas or other light hydrocarbons. In the case of steam reforming, it is generally necessary to treat the gas that is produced so as to eliminate the carbon dioxide that it contains, which complicates the operation. Furthermore, an adjustment of the hydrogen to carbon monoxide ratio is essential since the amount of hydrogen in the gas mixture that is formed is considerably larger than the ratio that is usually used in the Fischer-Tropsch reactor. This set of problems leads the inventors of this patent to consider the specific advantages of the use of partial oxidation which makes it possible to avoid the use of a system for separating the carbon dioxide and which makes it possible to obtain a gas mixture whose hydrogen to carbon monoxide ratio is closer to the desired ratio. Partial oxidation, however, is not the ideal solution.

This is why the inventors are considering using one or the other method for the production of synthesis gas with, in the case where steam reforming is used, the introduction of a predetermined amount of carbon dioxide in the reforming reactor and the use of a system for absorption and recovery of the carbon dioxide at the outlet of the reforming reactor. Furthermore, the process that is described in this patent requires the recycling of an amount of carbon dioxide in the formation stage of the synthesis gas whether in the partial oxidation stage or in the steam reforming stage that would make possible, according to the authors of this invention, a better conversion of total carbon, introduced in the scheme, into hydrocarbon products that contain in particular waxes that cannot be upgraded directly as an atmospheric distillate fraction and in particular as an engine fuel. The teaching of this patent therefore does not relate directly to a process that allows the optimization of the production of atmospheric distillate in a comprehensive system that comprises the use of Fischer-Tropsch technology.

The process according to this invention has as its object the optimization of the formation of atmospheric distillate, and mainly of engine fuels, from a hydrocarbon feedstock in an integrated process that limits as much as possible the drawbacks that are cited in the prior art and that comprise the production of a synthesis gas, whereby the transformation of this synthesis gas with Fischer-Tropsch technology into hydrocarbon compounds and an isomerizing hydrocracking transforms the heaviest compounds into lighter compounds that have, for those that are of the diesel variety and in particular of the diesel engine, a zero aromatic compound level, a very high cetane number, and lead to a very small soot formation, whereby those that are of the naphtha variety form an excellent steam-cracking feedstock, and those of the kerosene variety have a very good smoke point and a zero aromatic compound level.

In its broadest embodiment, this invention is defined as a process for the production of atmospheric distillate from a hydrocarbon feedstock that comprises the following stages:

a) a formation stage of a gas mixture that contains hydrogen and carbon monoxide in a ratio of about 1.7:1 to about 2.5:1, preferably about 2.0:1 to about 2.5:1, and more preferably about 2.1:1 to about 2.3:1 from said hydrocarbon feedstock,(both here and below the $H_2:CO$ ratio is in terms of a molar ratio), b) an at least partial conversion stage of the gas mixture that is obtained in stage a) at high temperature and pressure in the presence of a catalyst to obtain a liquid effluent that contains hydrocarbons that have at least 5 carbon atoms in their molecule and a gas effluent that contains the unconverted fraction of the gas mixture of stage a) and that contains carbon dioxide, c) a stage for treating the gas fraction that is obtained in stage b) under conditions that make it possible to eliminate the carbon dioxide at least partly and to obtain a gas fraction that is low in carbon dioxide and that is preferably recycled in stage a) for the formation of the gas mixture that contains hydrogen and carbon monoxide, d) a first fractionation stage of the liquid fraction that is obtained from stage b) in which a heavy fraction FL1 that contains basically hydrocarbons that have at least seven carbon atoms in their molecule and often at least 9 carbon atoms in their molecule, and a light fraction FL2 that contains basically hydrocarbons that have at most six carbon atoms in their molecule are separated, e) an isomerizing hydrocracking stage in which in the presence of a catalyst, at high temperature and pressure, and in the presence of hydrogen, heavy fraction FL1 that is obtained from stage d) is transformed into a fraction F2 that contains a larger amount of branched compounds than fraction FL1, f) a second fractionation stage, in which light fraction FL2 that is obtained from stage d) and fraction F2 that is obtained from stage e) are sent, and from which are separated a fraction that contains basically hydrocarbons that have at most 4 carbon atoms in their molecule from final boiling point to atmospheric pressure that is lower than about 37° C., often lower than 25° C. and most often lower than 5° C., a fraction that has a final boiling point at an atmospheric pressure that is greater than about 300° C., often greater than about 350° C. and most often greater than about 370° C., and at least one intermediate atmospheric distillate fraction that has a boiling point of between about 5° C. and about 370° C., often between about 25° C. and about 350° C.

According to a first embodiment, the formation of the gas mixture that contains carbon monoxide and hydrogen in the ratios that are indicated above will comprise a first stage a1) for catalytic steam reforming of a portion of the hydrocarbon feedstock at high temperature and pressure under conditions of formation of a basically gaseous effluent that contains hydrogen and carbon monoxide in a ratio that is greater than or equal to 2.3:1, often greater than or equal to 2.5:1 and most often greater than or equal to 3:1, a stage a2) for partial oxidation of another portion of the hydrocarbon feedstock under formation conditions of a basically gaseous effluent that contains hydrogen and carbon monoxide in a ratio that is less than or equal to 2:1, and a stage a3) in which at least a portion of the effluent that is basically gaseous that is obtained in stage a1) is mixed with at least a portion of the basically gaseous effluent that is obtained in stage a2) to obtain a basically gaseous mixture that contains hydrogen and carbon monoxide, whereby the amounts of feedstock treated in each of these stages a1) and a2) and those that are used to form this mixture are adjusted so that the ratio of the hydrogen to the carbon monoxide in the mixture that is obtained is in the range that is mentioned in stage a).

According to another embodiment, the formation of the gas mixture that contains carbon monoxide and hydrogen in the ratios that are indicated above will comprise a stage a1) for catalytic steam reforming, of at least one portion and often the majority and very often the entire hydrocarbon feedstock, at high temperature and pressure under formation conditions of a basically gaseous effluent that contains hydrogen and carbon monoxide in a ratio that is greater than or equal to 2.3:1, often greater than or equal to 2.5:1 and most often greater than or equal to 3:1, a stage a2) for partial oxidation of at least a portion of the mixture that is basically gaseous that is obtained from stage a1) and that contains at least one unconverted compound during stage a1) under formation conditions of a basically gaseous mixture that contains hydrogen and carbon monoxide in a ratio that is located in the range that is mentioned in stage a).

According to another embodiment, the formation of the gas mixture that contains carbon monoxide and hydrogen in ratios that are indicated above will comprise a partial oxidation stage a1), at least one portion and often the majority and very often the entire hydrogenation feedstock, at high temperature and pressure under formation conditions of a basically gaseous effluent that contains hydrogen and carbon monoxide in a ratio that is less than or equal to 2.2:1 and often less than or equal to 2.1:1 and under certain conditions less than or equal to 2:1, a catalytic steam reforming stage a2) of at least a portion of the basically gaseous mixture that is obtained from stage a1) and that contains at least one unconverted compound during stage a1) under formation conditions of a basically gaseous mixture that contains hydrogen and carbon monoxide in a ratio that is located within the range that is mentioned in stage a).

According to a special embodiment of this invention, the hydrocarbon feedstock from which the mixture of carbon monoxide and hydrogen is formed is a hydrocarbon feedstock that contains at least one hydrocarbon compound that has less than 4 carbon atoms in its molecule. This hydrocarbon feedstock is most often selected from the group that is formed by a naphtha, methane and natural gas previously treated under conditions that allow the elimination of the majority of the carbon dioxide and the hydrogen sulfide that it contains. Although any means that is well known to ones skilled in the art can be used to purify the natural gas and to eliminate the majority and preferably almost all of the hydrogen sulfide and carbon dioxide that is obtained, a prior treatment of this natural gas by a solution of at least one amine is advantageously used under conditions that allow the elimination of the carbon dioxide and the hydrogen sulfide by absorption, whereby said amine is most often selected from the group that is formed by monoethanolamine, diethanolamine, diglycolamine, diisopropylamine, and methyldiethanolamine. It is also possible to provide an additional treatment that allows an even more intense elimination, by, for example, using an adsorption mass of acid compounds.

According to a variant that allows in particular increased flexibility in the overall operation of the process of the invention, a portion of the basically gaseous effluent that is obtained from stage a) and/or stage a1) and/or stage a2) is sent into a conversion zone in which a hydrogen-enriched gas mixture is formed. This conversion zone comprises at least one reactor in which in the presence of steam, the carbon monoxide that is contained in the effluent that is obtained from stage a) and/or a1) and/or a2) is transformed into carbon dioxide and hydrogen. The steam that is used in this zone can either be added into the conversion reactor or all or part of this steam can be contained in the gas effluent that is obtained from stage a), and/or a1) and/or a2). The hydrogen-enriched gas mixture that is thus obtained is then usually treated in a zone that allows the elimination of the majority and preferably almost all of the carbon dioxide. Advantageously, at least one means of an adsorption unit of the carbon dioxide will be used whose adsorbent is regenerated periodically. This regeneration can be carried out by variation of pressure (PSA) or by variation of temperature (TSA). The gas that is thus obtained that contains basically, and most often almost only, hydrogen is most often sent into isomerizing hydrocracking stage e).

In an advantageous embodiment of the process of this invention, the gas fraction that is low in carbon dioxide and that is obtained in stage c) is at least partly recycled in stage a) for the formation of the synthesis gas (basically gaseous mixture that contains hydrogen and carbon monoxide) and/or, after the methane that is contained in this fraction is separated, in at least partial conversion stage b) of the gas mixture, obtained in stage a) and/or in stage a1) and/or in stage a2), at high temperature and pressure in the presence of a catalyst to obtain an effluent that contains liquid hydrocarbons that have at least 5 carbon atoms in their molecule.

According to another advantageous embodiment of the process of this invention, the fraction that basically contains hydrocarbons that have at most 4 carbon atoms in their molecule from final boiling point to an atmospheric pressure that is less than about 37° C. that is obtained in stage f) is at least partly recycled in stage a) and/or in stage a1) and/or in stage a2).

According to another advantageous variant embodiment of the process of this invention, the fraction that has a final boiling point at an atmospheric pressure that is greater than about 300° C. and that is obtained in stage f) is at least partly recycled in isomerizing hydrocracking stage e).

Finally, within the scope of this invention, the atmospheric distillate that has a boiling point of between about 5° C. and about 370° C. and that is obtained in stage f) can be sent into a fractionation zone from which a naphtha fraction, as well as a kerosene fraction and/or a gas oil fraction are recovered. Within the context of this description, naphtha fraction refers to a fraction that has a final boiling point of between about 25° C. and about 220° C. and often between about 30° C. and about 200° C. Kerosene fraction refers to a fraction that has a final boiling point of between about 170° C. and 275° C. and often between about 180° C. and about 250 C., and gas oil fraction refers to a fraction that has a final boiling point of between about 210° C. and 370° C., preferably between 220 C. and 370° C., and more preferably between about 250° C. and about 350° C.

The recovery of heat in the effluents from partial oxidation and steam reforming allows the generation of HP (high pressure) vapor which drives a turboalternator that produces the electricity that is necessary to the operation of the complex.

The energy that is produced by the Fischer-Tropsch unit is used to generate the MP (mean pressure) vapor, which drives a turboalternator that produces electricity and that, in the same way as the electricity that is produced with the HP vapor, takes part in the electrical supply of the complex.

All of the electricity that is needed for all of the units of the process according to the invention thus can be produced. It is even possible to produce an excess that can be exported or used in a related process.

The stage of formation of the synthesis gas (i.e., of a gas that contains carbon monoxide, hydrogen, and most often a little carbon dioxide) from a hydrocarbon feedstock and in particular from natural gas or methane is usually carried out under standard conditions that are well known to ones skilled in the art. When natural gas is used, the latter, that most often contains significant amounts of acid compounds and in particular carbon dioxide and hydrogen sulfide, and even possibly nitrogen, is previously treated under conditions that allow the elimination of the majority of these compounds. Thus, for example, the natural gas is sent into an absorption zone in which it is brought into contact with a solution of an absorbent that allows the absorption of at least one of the acid compounds that it contains. In a special embodiment of this absorption, the natural gas will be brought into contact with a basic solution, preferably an aqueous solution of an amine that is selected from the group that is mentioned above, which forms with the carbon dioxide and/or with the hydrogen sulfide an addition compound which makes it possible to obtain a purified gas that contains ratios of acid compounds that are to a large extent less than 500 ppm by weight and often less than about 100 ppm by weight both as far as the remaining amount of carbon dioxide and the remaining amount of hydrogen sulfide are concerned. Most often, the remaining amount of carbon dioxide is less than about 10 ppm by weight and the remaining amount of hydrogen sulfide is less than about 50 ppm by weight and very often less than about 10 ppm by weight. This method for purification of the natural gas is a standard method that is well known to ones skilled in the art and extensively described in the literature and, for example, succinctly described in Ulmann's Encyclopedia Volume A12, pages 258 ff. Within the scope of this invention, the treatment by an amine aqueous solution is usually carried out at a temperature of about 10 to about 100° C. and often about 20 to about 50° C. Usually, the amount of amine that is used is such that the molar ratio of acid gases to amine is about 0.1:1 to about 1:1 and often about 0.3:1 to about 0.8:1 and, for example, about 0.5:1. The pressure at which the absorption by the amine solution of acid gases is carried out is usually about 0.1 MPa to about 50 MPa, often about 1 MPa to about 25 MPa and most often about 1 MPa to about 10 MPa. Most often, a monoethanolamine solution is used. The regeneration of the amine solution is routinely carried out by pressure variation. To obtain a more intensive elimination of the acid compounds that are initially present in the natural gas, it is also possible to provide an additional treatment, such as, for example, a treatment of gas that is low in acid compounds, that emerges from the absorption stage via a solvent of these acid compounds, into an adsorption zone of the acid gases that comprises at least one column and often at least two adsorption columns that contain, for example, zinc oxide, and that operate, for example, at a temperature of about 10° C. to about 400° C., and often about 10° C. to about 100° C. and most often about 20° C. to about 50° C. under a total pressure of about 0.1 MPa to about 50 MPa, often about 1 MPa to about 25 MPa and preferably about 1 MPa to about 10 MPa. According to this embodiment, when the adsorption zone comprises two columns, one column is used to treat the natural gas while the other is being regenerated. At the outlet of this additional treatment, the content of acid compounds in the gas is usually less than 1 ppm by weight and often on the order of several tens of ppb by weight.

Stage a) for the formation of synthesis gas of the process of this invention is a stage that is well known to ones skilled in the art in which several processes can be implemented. Among these processes within the scope of this invention, partial oxidation of naphtha, natural gas or methane, steam reforming, or the authothermal process which combines the two previous processes will advantageously be used. Most often, when a single one of these processes is used to produce the synthesis gas, it is necessary to adjust the hydrogen to carbon monoxide ratio, which is either most often slightly low in the case of the partial oxidation process, or most often slightly high in the case of the steam reforming process. This adjustment can be carried out according to standard techniques that are well known to ones skilled in the art and described in, for example, Ullmann's Encyclopedia Volume A5, pages 209 ff. In the case of the autothermal process, the hydrogen to carbon monoxide ratio can be adjusted quite easily by regulating the injection flow rate of the steam, and this ratio is most often quite close to the value that is desired to carry out the Fischer-Tropsch reaction.

The steam reforming process of naphtha, methane or natural gas is described in, for example, Ulmann's Encyclopedia Volume A12, pages 186 ff. The reaction is usually carried out in a furnace, for example a tubular furnace, at a temperature that is usually about 700° C. to about 1200° C. and most often about 750° C. to about 1000° C., under a pressure of about 0.2 to about 10 MPa and most often about 0.4 to about 6 MPa. The molar ratio of water to carbon is usually about 0.2:1 to about 10:1 and often about 1:1 to about 6:1. Within the scope of this invention, most often a steam reforming catalyst that comprises nickel that is deposited on a mineral substrate, for example an alumina based an substrate, will be used. This process most often leads to obtaining a very hydrogen-rich gas that most often has a hydrogen to carbon monoxide ratio of about 3:1 to about 10:1 and often from 4:1 to about 6:1 according to the operating conditions that are used.

The process of partial oxidation of naphtha, methane or natural gas is described in, for example, the article that is published in the journal Pétrole et Technique [Petroleum and Technique] No. 355 of Apr. 1990, pages 28 ff. or else the article that is published in "Revue de l'Institut Francais du Pétrole" Vol. 51, No. 5, pages 711 ff. Partial oxidation is most often implemented by using a very oxygen-enriched gas that contains, for example, 99% by volume of oxygen. This strongly exothermic reaction can be carried out at relatively high pressure and does not require the use of furnaces that are heated by outside burners. It can be purely thermal, for example, by working at a temperature of about 1000° C. to about 1500° C., for example in ceramic reactors or with ceramic walls at a pressure of about 0.4 to about 10 MPa and often about 1 to about 6 MPa. It can also be catalytic by using, for example, a catalyst that comprises a metal of group VIII, for example nickel. Preferably, however, a catalyst is used that comprises a noble metal from this group VIII, such as platinum, rhodium, ruthenium, iridium, or palladium. The reaction conditions are usually in the same range as that of the non-catalytic formation. A catalyst that contains rhodium will preferably be used. The catalyst that is used is generally a catalyst that is supported by a mineral substrate with, for example, an alumina base.

Finally, another solution for the formation of the synthesis gas consists in using a so-called autothermal unit in which the strongly exothermic partial oxidation reaction and the endothermic steam reforming reaction are combined within the same reaction chamber. This unit is supplied like the partial oxidation unit by a gas with a very high oxygen content. Usually, in this type of unit, a partial thermal oxidation is used, which is followed by an introduction of steam for carrying out the steam reforming from the mixture of gas that is obtained by partial oxidation. Description elements of this method for the production of synthesis gas will be found in, for example, the article that is published in "Revue de l'Institut Francais du Pétrole" Vol. 51, No. 5, pages 711 ff. and also in British Patent GB 2 183 672. According to a preferred embodiment, a nickel based catalyst on a mineral substrate, for example, an alumina based substrate, will be used for this autothermal unit for the steam reforming of the gas mixture that is obtained from partial oxidation. The operation is usually carried out at a temperature that is usually about 700° C. to about 1200° C. and most often about 850° C. to about 1100° C., under a pressure of about 0.2 to about 10 MPa and most often of about 0.4 to about 6 MPa. The molar ratio of water to carbon is usually about 0.2:1 to about 10:1 and often about 1:1 to about 6:1. The hydrogen to carbon monoxide ratio that is obtained is about 1.5:1 to about 2.5:1 according to the amount of water used. This amount of water can be adjusted so as to obtain a ratio of hydrogen to carbon monoxide of about 1.7:1 to about 2.3:1.

The synthesis gas that is obtained by at least one of the methods that is described above and preferably by the combination of a steam reforming and a partial oxidation as mentioned above is introduced into a zone for synthesis of hydrocarbons according to the so-called Fischer-Tropsch technology that makes it possible to obtain a hydrocarbon fraction that contains hydrocarbons that have at least five carbon atoms in their molecule, mixed with a gas fraction that contains hydrocarbons that have less than five carbon atoms in their molecule, carbon dioxide and the unconverted fraction of the synthesis gas. Water is also produced in this zone, which is preferably separated from hydrocarbons before fractionation in stage d) or during said fractionation. Any means that is known to one skilled in the art can be used to separate the water, for example, a separation by decanting.

All of the Fischer-Tropsch technologies that are well known to one skilled in the art and fully described from the first works that date from 1902 can be implemented. It is thus also possible to use a fixed-bed technology, fluidized-bed technology or suspension technology (slurry according to the Anglo-Saxon name that is widely used in the petroleum field). A description of the reactors that are used will be found in, for example, the article that is published in "Revue de l'Institut Francais du Pétrole" Vol. 51, No. 5, pages 711 . Within the scope of this invention, most often it will be preferable to use a technology that implements an approximately vertical triphase reactor in which a catalyst that contains at least one metal of group VIII and optionally other modifying agents on a mineral substrate is kept suspended in a liquid that comprises most often waxes with a more or less long chain. The liquid that is used is most often a paraffinic fraction and, for example, the liquid hydrocarbon mixture that is formed by the Fischer-Tropsch reaction.

The catalyst that is preferably used is a cobalt based catalyst. The substrate that is used is usually a substrate with an alumina, silica or titanium oxide base. Most often, an alumina based substrate is used. Usually, the cobalt concentrations can be at least about 3% by weight, preferably 5 to 45% by weight, and more preferably about 10 to 30% by weight relative to the total weight of the catalyst. The catalyst can also contain another metal, which is either active as a Fischer-Tropsch catalyst, for example, a metal of groups 6 to 8 of the periodic table of elements, such as ruthenium, or a promoter metal, such as, for example, molybdenum, rhenium, tantalum, zirconium, cerium or uranium. The promoter metal(s) is (are) usually present at a ratio of at least 0.05:1 relative to cobalt, preferably at least 0.1:1 and, better yet, 0.1:1 to 1:1. The catalyst can also comprise an alkaline or alkaline-earth agent and/or rare earths.

For example, it is possible to use a catalyst that contains cobalt, at least one additional element M that is selected from the group that consists of molybdenum and tungsten and at least one additional element N that is selected from the group that is formed by the elements of groups Ia, IIa, Ib, ruthenium, palladium, uranium, praseodymium and neodymium. Whereby elements M and N are dispersed on a support, said catalyst is preferably prepared by gelling as Patent FR-A-2 677 992 describes it. It is also possible to use a catalyst that is prepared by gelling that contains cobalt, ruthenium and copper, as U.S. Pat. No. 5,302,622 describes it. Any catalyst that is known to one skilled in the art can also be considered, however.

The catalyst is generally in the form of calibrated fine powder that usually has a diameter of about 10 to 700 $\mu$m, often about 10 to 200 $\mu$m, and most often about 20 to 100 m. It is used in the presence of a gas phase and a liquid phase that can comprise, for example, one or more hydrocarbons that have at least 5 carbon atoms per molecule. The feedstock of solids, i.e., the volume of catalyst per volume of suspension or diluent, can reach about 50% and is preferably in a range of 5 to 40%.

The bubble columns that can be used advantageously for the implementation of the process of the invention comprise a liquid medium that contains in suspension solid particles, generally in large part catalytic particles, and comprise at least one means of introducing at least one gas phase of reagents by at least one distributing means that produces gas bubbles that usually have a relatively small diameter or (by way of indication) generally from 0.5 to 20 mm of diameter. These gas bubbles climb in the column, and the reagents are absorbed by the liquid and diffuse toward the catalyst, in contact with which the reagents are converted into gas products and/or liquid products according to the conditions of the reaction and the type of catalyst. The gas products that comprise unconverted gas reagents and the gas products that are formed during the reaction are collected near the top of the column, and the suspension that contains the liquid that is used to form the suspension of the catalyst and the liquid products that are formed during the reaction is recovered by a line that is located at a level that is close to the upper level of the suspension in the column. The solid particles are then separated from the liquid by any means that is well known to one skilled in the art, for example by filtration, to recover the liquid products that are formed during the reaction. It is possible by cooling gas products that are collected close to the top of the column to separate the light paraffins that are condensed, and the water that is produced that condenses is usually sent into a zone for water treatment. The uncondensed gas phase can be sent back to the production of synthesis gas. Most often, the uncondensed gas phase or the gas products that are collected close to the top of the column that contain carbon dioxide are sent into a decarbonation zone that operates under standard conditions that are well known to ones skilled in the art, in which the carbon dioxide is usually discharged into the atmosphere, whereby the other components are most often recycled in the zone for production of the synthesis gas.

Within the scope of such a synthesis of hydrocarbons, two different types of implementation are known to one skilled in the art as is described in many patents and in particular in Patents EP-B-450 861 and EP-B-450 860. These two types of implementations are, on the one hand, the use of reactors with total continuous stirring or reactors that are stirred perfectly, and, on the other hand, the use of piston flow reactors. The big difference between these two types of implementation is the concentration of reagents that provides the driving force for the reaction. In the system with continuous total stirring, the concentration of the reagents is the same at any point of the reactor whereas in the piston system, the concentration of the reagents decreases uniformly along the catalytic bed from the inlet of the reactor toward the outlet of the reactor, and the rate of reaction is obtained by integrating the function of speed from the inlet to the outlet. These two types of implementations can be used within the framework of this invention, and the teaching that is provided in those two patents should be considered as an integrating part of this invention solely from the fact of the citation of these two patent documents.

Although the description of Patent EP-B-450 860 argues against one skilled in the art using liquid recirculation because it involves, in the case of a mechanically-assisted recirculation, the addition of pumps and additional filters that influence the investment costs and the operation costs and that complicate the implementation of the process, it is possible to use, in a particular implementation of the process of this invention, a recirculation that is assisted mechanically with pumps, which is in particular an advantage in terms of gain of productivity that is high enough to justify its implementation.

Thus, in this implementation, the device that is used comprises an approximately vertical reactor that contains a suspension of at least one solid that is formed at least partly with catalytic particles in at least one liquid that comprises at least one means for introducing gas that is generally in bubble form close to the inside end of said reactor, at least one means for drawing off gas close to the upper end of said reactor, at least one means for drawing off at least a portion of the suspension close to the highest level of the liquid fraction of said suspension in said reactor, said device also comprises at least one recirculation means of at least a portion of the liquid fraction of said suspension and optionally the solid fraction of said suspension that makes it possible to obtain a surface circulation velocity of suspension $U_1$ within the reactor, preferably at least equal and most often greater than sedimentation velocity Us of solid particles. The recirculation can be inside or outside (relative to the reactor) and can be assisted mechanically (for example with a pump) or not (recirculation induced by the difference of density between the suspension (the "slurry") that is aerated by the gas phase and the non-aerated recirculated "slurry"). The recirculation that is not assisted mechanically is sometimes referred to as natural recirculation or gas siphon. Surface velocity U1 of the suspension in circulation in the reactor is preferably greater than 0.5 cm/s and usually about 0.5 cm/s to about 20 m/s, preferably about 1 cm/s to about 10 m/s and even more preferably about 1 cm/s to about 5 m/s.

In a special embodiment of the invention, the reactor comprises at least one internal heat exchanger. The device for implementing the Fischer-Tropsch reaction that is used within the scope of this invention according to this implementation can also comprise at least one heat exchanger in the recirculation loop, either included in the chamber of the reactor in the case of a device that comprises an internal natural recirculation means in the reactor or external in the other cases.

The reaction conditions for synthesis of hydrocarbons are generally well known to ones that are skilled in the art. Within the scope of this invention, the temperatures can go from 150 to 380° C., preferably from 180 to 350° C., or, better yet, from 190 to 300° C. The pressures are normally greater than about 0.5 MPa, preferably 0.5 to 5 MPa, or, better yet, from about 1 to 4 MPa. The rise in temperature generally increases productivity, all things being equal furthermore; however, the selectivity for methane tends to increase and the stability of the catalyst to diminish when the temperature increases. Thus, in such a case, although the conversion of CO increases, the yield of desirable liquid products, for example products of $C_5^+$, preferably $C_9^+$ or $C_{10}^+$, cannot be as large when the temperature rises.

The liquid products that are recovered from the hydrocarbon synthesis zone according to the Fischer-Tropsch process are routinely sent into a first fractionation zone D1 that most often comprises at least one column that is to be distilled that operates generally at atmospheric pressure and that makes it possible to obtain a heavy fraction FL1 that is described above and a light fraction FL2 that is described below. Fraction FL2 is sent into a second fractionation zone D2 that most often comprises at least one column that is to be distilled that operates in general at atmospheric pressure and that makes it possible to obtain at least one fraction that basically contains hydrocarbons that have at most 4 carbon atoms in their final boiling point molecule at atmospheric pressure that is usually lower than about 37° C. that can be recycled in the stage for formation of synthesis gas, a fraction that usually has a final boiling point at atmospheric pressure that is greater than about 300° C., which is usually sent back at least in part to the isomerizing hydrocracking stage and at least one atmospheric distillate that generally has a boiling point of between about 5° C. and about 370° C. In a special implementation of the second fractionation zone, it is possible to divide the atmospheric distillate that has a boiling point of between about 5° C. and about 370° C. into several fractions and, for example, into a naphtha fraction, a kerosene fraction and a gasoline fraction.

Heavy fraction FL1 that is separated from first fractionation zone D1 is usually sent into an isomerizing hydrocracking zone in which is formed an isomerized and hydrocracked product that contains more branched compounds and/or lighter compounds than those that are contained in the starting heavy fraction. These more branched compounds and/or these lighter compounds than those that are contained in the starting heavy fraction are sent into second fractionation zone D2. They contribute to obtaining more atmospheric distillate and also an atmospheric distillate that has better qualities than the one that would result only from the fractionation of fraction FL1 that is obtained from first fractionation zone D1. Most often, this isomerizing hydrocracking stage is carried out under standard conditions that are well known to one skilled in the art. The isomerizing hydrocracking zone will generally comprise at least one reactor that contains at least one fixed catalyst bed that has a hydrogenating function that makes possible the isomerization of the products and an acid function that promotes the cracking of heavy products. Most often, a catalyst will be selected that has a significant hydrogenating function to strongly promote isomerization and a mean acid function to obtain good activity. The acid function is usually provided by substrates that have large specific surface areas, for example, from 100 to 800 $m^2 \cdot g^{-1}$ that have a surface acidity, such as the halogenated aluminas (chlorinated or fluorinated, for example), phosphorated aluminas, combinations of boron oxide and aluminum oxide, amorphous silicas-aluminas and silicas-aluminas. The hydrogenating function is provided either by one or more metals of group VIII of the periodic table of elements, such as iron, cobalt, nickel, ruthenium, rhodium, palladium, osmium, iridium and platinum, or by a combination of at least one metal of group VI, such as chromium, molybdenum and tungsten, and at least one metal of group VIII. Of the metals of group VIII, most often a noble metal, and in particular platinum itself, is used. Most often, the substrate will be a silica-alumina that contains 5 to 70% by weight of silica, preferably 20 to 60% by weight of silica and most often 20 to 45% by weight of silica. The noble metal content of group VIII is usually about 0.05 to about 10% by weight of metal relative to the catalyst and often about 0.1 to about 5% by weight. The specific surface area of the substrate is often about 150 to about 500 $m^2 \cdot g^{-1}$, preferably about 250 to about 450 $m^2 \cdot g^{-1}$ and most often about 300 to about 450 $m^2 \cdot g^{-1}$. The pore volume of the substrate is usually less than about 1 ml/g, often about 0.3 to about 0.9 ml/g.

The balance between the two acid and hydrogenating functions is a large parameter that governs the activity and the selectivity of the catalyst. If the acid function is weak and the hydrogenating function is strong, a catalyst will be obtained that is not very active but is selective with regard to isomerization, whereas if the acid function is strong and the hydrogenating function is weak, the catalyst will be very active and selective with regard to the cracking. It is also possible to use a catalyst that has a strong acid function and a strong hydrogenating function which will then be very active but also very selective with regard to isomerization. It is therefore possible to adjust the activity/selectivity pair of the catalyst.

The reaction is usually implemented under a partial hydrogen pressure of about 0.5 to about 25 MPa, advantageously about 1 to 20 MPa and preferably about 2 to 18 MPa, at a temperature of about 200 to 500° C., advantageously about 250 to about 480° C., preferably about 300 to about 450° C. and most often about 320 to about 420° C., with an hourly volumetric flow rate of about 0.1 to about 10 $h^{-1}$, advantageously about 0.2 to about 8 $h^{-1}$ and preferably about 0.5 to about 5 $h^{-1}$, and a hydrogen/hydrocarbon volumetric rate of about 50:1 to about 2000:1, advantageously about 100:1 to about 1500:1 and preferably about 150:1 to about 1000:1.

In the case where heavy fraction FL1 that is separated from first fractionation zone D1 has a high content of unsaturated or oxidized products and a large content of metal that comes from the catalyst that is used in the Fischer-Tropsch reactor that can bring about excessive deactivation of the catalytic system that is used in the isomerizing hydrocracking zone, it will be possible to subject this fraction to hydrotreatment and/or hydrodemetallization before introducing it into the isomerizing hydrocracking zone. This hydrotreatment is routinely carried out by bringing this heavy fraction into contact with hydrogen in the presence of a standard hydrotreatment catalyst. This hydrotreatment catalyst is a non-cracking catalyst that usually comprises at least one matrix that preferably has an alumina base and at least one metal or metal compound that has a hydro-dehydrogenating function. The matrix can also contain the silica-alumina, boron oxide, magnesia, zirconia, titanium oxide, clay or a combination of theses oxides. The hydro-dehydrogenating function may be ensured by at least one metal of group VIII, such as nickel and cobalt in particular. It is also possible to use a combination of at least one metal or metal compound of group VI (in particular molybdenum or tungsten) and at least one metal of group VIII (in particular nickel or cobalt). The hydro-dehydrogenation component can also be a noble metal (platinum or palladium in particular), for example at a rate of about 0.001 to about 5% by weight relative to the weight of the finished catalyst. The non-noble metal concentration of group VIII, when the latter is used, is, for example, about 0.01 to about 15% by weight relative to the weight of the finished catalyst. The hydrotreatment catalyst can advantageously also contain phosphorus in an amount that is expressed by weight of phosphorus oxide $P_2O_5$ that is less than about 15% and most often less than about 10%. In the hydrotreatment zone, the partial hydrogen pressure will be, for example, from about 0.5 to about 25 MPa, advantageously about 2 to about 20 MPa, and the temperature will be, for example, from about 250 to about 500° C., advantageously about 300 to about 400° C.

The decarbonation of the gas mixture that is obtained from the hydrocarbon synthesis zone according to the Fischer-Tropsch reaction is carried out under standard conditions that are well known to ones skilled in the art and are extensively described in literature and, for example, succinctly described in Ullmann's Encyclopedia Volume A2, pages 180 ff. Thus, for example, it is possible to employ a process that uses the absorption of carbon dioxide in an aqueous solution of potassium carbonate. The effectiveness of the carbonic gas absorption is improved by the presence of additives in the carbonated solution. Among the additives that can be used, it is possible to cite diethanolamine, vanadium pentoxide and amine borates. This absorption is usually carried out under a total pressure of about 0.3 to about 10 MPa and at a temperature of about 50° C. to about 150° C. The carbon dioxide-rich solution that is obtained is usually regenerated by pressure reduction and dewatered by steam in a stripping column. This type of absorption makes it possible to treat gases that contain up to several tens of percent by weight of carbon dioxide. Among the widely developed commercial processes, it is possible to cite in particular the Benfield process and the Catacarb process.

The production of hydrogen by conversion of carbon monoxide by steam is a standard reaction that is extensively described in prior literature and, for example, in Ullmann's Encyclopedia Volume A12, pages 238 ff. The gas mixture that is thus obtained contains carbon dioxide that is eliminated most often by using a standard system of elimination by variation of pressure that is well known to ones skilled in the art for the purification of hydrogen and, for example, described in Ullmann's Encyclopedia Volume A12, pages 267 ff. Hydrogen whose purity can exceed 99.9% by volume is thus obtained.

BRIEF DESCRIPTION OF DRAWINGS

FIG. 1 illustrates the simplest embodiment of this invention, and

FIG. 2 illustrates an embodiment that comprises various recycling steps and the incorporation into the scheme of a hydrogen production system by conversion of a portion of the carbon monoxide by reaction with water and the use of this hydrogen in the isomerizing hydrocracking zone.

In FIG. 1, the hydrocarbon feedstock is introduced via line 1 into zone O1 for formation of the synthesis gas. The gas mixture that is obtained from zone O1 for formation of the synthesis gas is sent via line 5 into zone R1 for synthesis of hydrocarbons according to the Fischer-Tropsch reaction. A gas mixture that contains the gas products that are formed in zone R1, the unconverted synthesis gas and the carbon dioxide that is sent into decarbonation zone R2 are recovered via line 23. A gas that basically contains carbon dioxide is recovered via line 25, and a gas that contains gaseous hydrocarbons, carbon monoxide and hydrogen are recovered via line 22.

The water that is formed in the Fischer-Tropsch synthesis (stage b)) is separated from the effluent that is obtained from this stage and in particular the liquid hydrocarbons, then evacuated via line 37. The separation of the water can be carried out with any technique that is known to one skilled in the art such as, for example, decanting. Some or all of this water can be used after treatment in a suitable pollution control unit, for example, in a unit for conversion of carbon monoxide by steam, a steam reforming unit or in the reforming section of an autothermal unit when these units are present in zone O1. It is also possible to use some or all of this water to irrigate dry, and even desert zones that are optionally close.

From zone R1, the liquid fraction that contains hydrocarbons that is obtained is sent via line 11 into a fractionation zone D1 from which a light liquid fraction FL2 is obtained that is sent via line 15 into a fractionation zone D2, and a heavy liquid fraction FL1 that is sent via line 13 into isomerizing hydrocracking zone R6. Hydrogen is introduced into isomerizing hydrocracking zone R6 via line 24, and a mixture that contains the hydrocracked and isomerized products that are formed in zone R6 is recovered via line 16, and said mixture is sent, via this line, into fractionation zone D2. From fractionation zone D2, a gas fraction is obtained via line 18, a liquid fraction that forms the desired atmospheric distillate is obtained via line 30, and a heavy liquid fraction is obtained via line 17.

Figure 1:
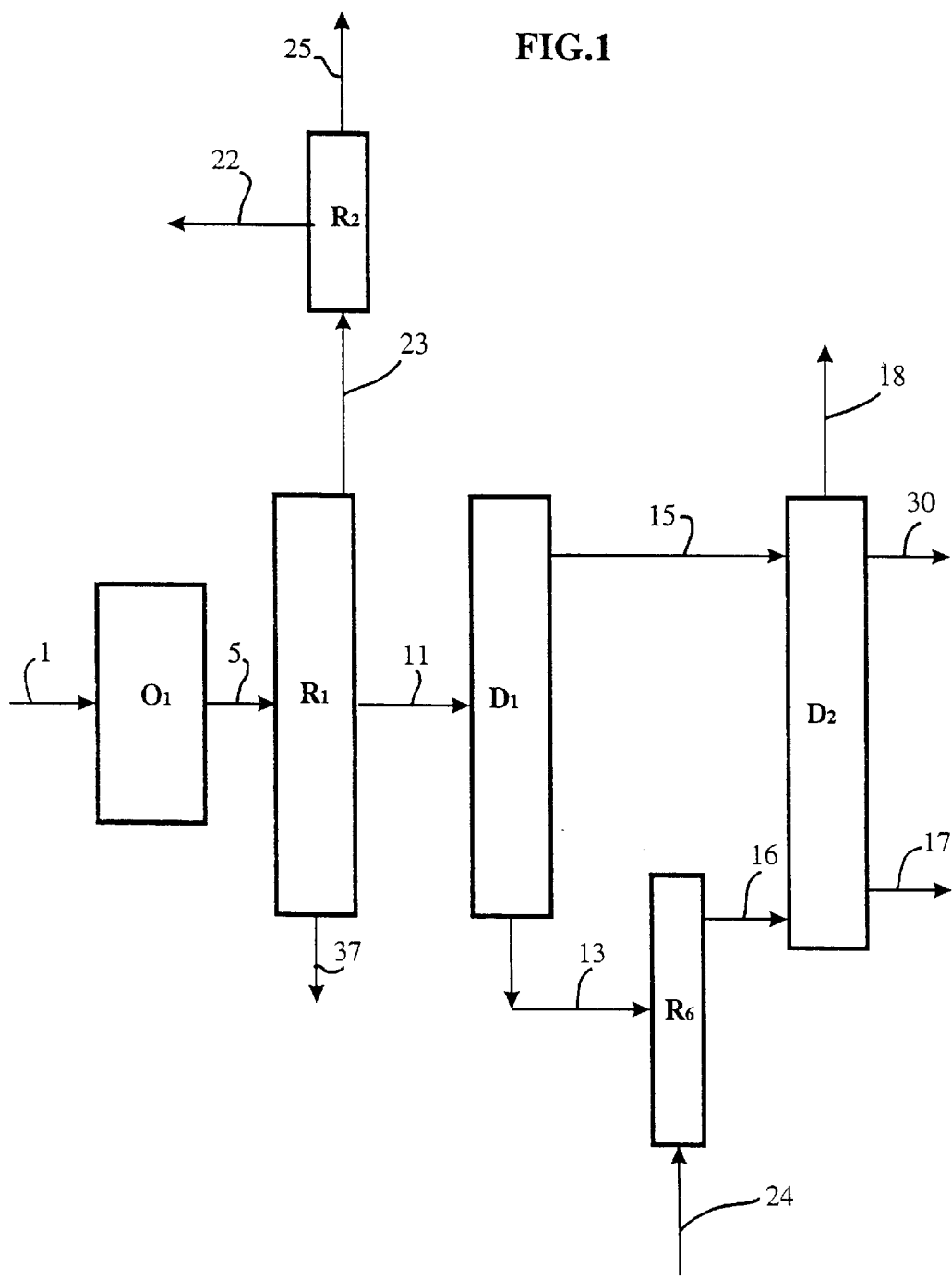
FIGS. 1 and 2 illustrate the invention diagrammatically without limiting its scope.
Figure 2:
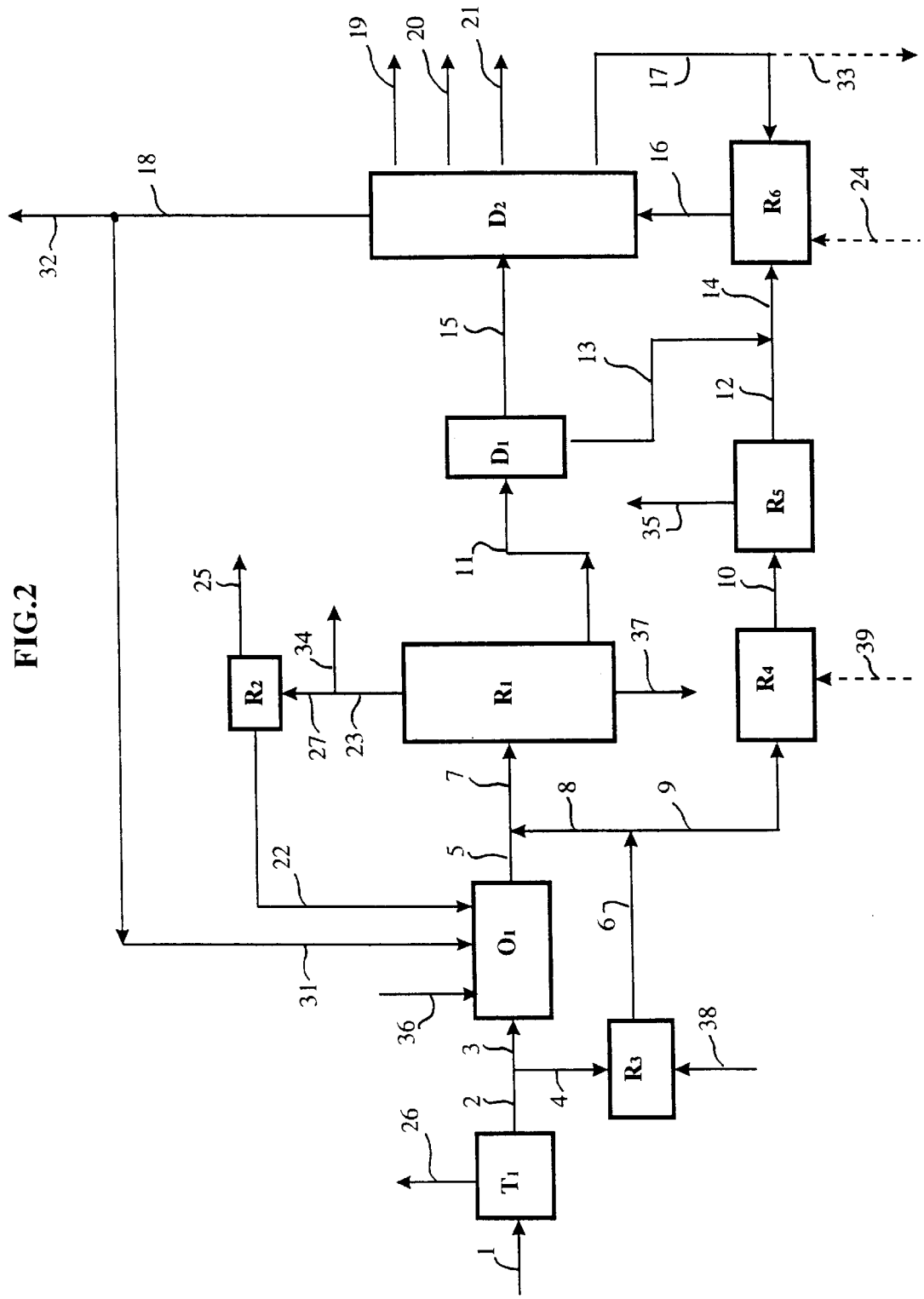

According to a special embodiment of the invention, diagrammed in FIG. 2, the hydrocarbon feedstock that contains hydrogen sulfide is introduced via line 1 into a desulfurization zone T1 from which a gas fraction that contains almost all of the hydrogen sulfide that is initially present in the feedstock is obtained via line 26, and a hydrocarbon feedstock that is basically free of hydrogen sulfide is obtained via line 2. According to an embodiment that is not shown in FIG. 2, the gas fraction that contains the hydrogen sulfide can be sent into a treatment zone that makes its elimination possible in the form of elementary sulfur. This zone can comprise a treatment unit according to the Claus process that is well known to ones skilled in the art and that is described succinctly in Ullmann's Encyclopedia Volume A17, pages 95 ff. and in addition a Clauspol finishing unit according to the technology that is developed by the applicant.

A portion of the feedstock that is essentially fully desulfurized is sent via line 3 into zone O1 for formation of synthesis gas by partial oxidation, and another portion is sent via line 4 into zone R3 for the formation of synthesis gas by steam reforming. The oxygen that is needed for the partial oxidation unit of zone O1 can be pure oxygen that is obtained from, for example, a cryogenic unit for separating oxygen from air, optionally located upstream. Any other gas that contains oxygen in a variable amount, or even air, can be used as an oxygen source. This oxygen source is introduced via line 36. The water that is needed for the reforming unit in zone R3 is introduced via line 38. The synthesis gas that is obtained by partial oxidation that emerges via line 5 is sent via lines 5 and 7 in a mixture with at least one portion of the latter that is obtained by steam reforming that comes in via lines 6, 8 and 7 into zone R1 for synthesis of hydrocarbons according to the reaction of Fischer-Tropsch synthesis. A gas mixture that contains the gas products that are formed in zone R1, the unconverted synthesis gas and carbon dioxide are recovered via line 23, and they are sent at least partly via line 27 into decarbonation zone R2, another portion of this gas mixture can be evacuated via line 34. This gas mixture that is evacuated via line 34 can be used to supply combustible gas furnaces, it is also used at least in part as a nitrogen purge for the complex in the case, for example, where the hydrocarbon feedstock contains it. A gas that basically contains carbon dioxide is recovered via line 25, and a gas that contains gaseous hydrocarbons, carbon monoxide and hydrogen that is recycled at least partly in zone O1 for formation of synthesis gas by partial oxidation is recovered via line 22. The water that is produced in the Fischer-Tropsch synthesis is separated from the liquid hydrocarbons. From zone R1, the liquid fraction that contains the hydrocarbons that is obtained is sent via line 11 into a fractionation zone D1 from which a light liquid fraction FL2 is obtained that is sent via line 15 into a fractionation zone D2 and a heavy liquid fraction FL1 that is sent via lines 13 and 14 into an isomerizing hydrocracking zone R6. If necessary, it is possible to introduce make-up hydrogen into isomerizing hydrocracking zone R6 via line 24. A portion of the synthesis gas that is obtained by steam reforming that emerges from zone R3 is sent via lines 6 and 9 into a zone R4 for conversion of carbon monoxide by steam into a mixture that contains carbon dioxide and hydrogen. The water that is needed for this unit is either partly contained in the effluent that is obtained from the reforming (zone R3) or supplied via line 39. When a great excess of steam is introduced into the reforming unit (zone R3), it is optionally no longer necessary to add additional steam via line 39. This gas mixture is sent via line 10 into adsorption zone R5 with regeneration by variation of pressure from which essentially pure hydrogen is obtained that is sent via lines 12 and 14 into isomerizing hydrocracking zone R6. A mixture that contains the hydrocracked and isomerized products that are formed in zone R6 is recovered via line 16 and is sent, via this line, into fractionation zone D2. A gas fraction that contains the carbon dioxide that is desorbed by periodic pressure reduction is evacuated from adsorption zone R5 via line 35 with regeneration by variation of pressure. From fractionation zone D2, a gas fraction that is partly recycled via line 31 into zone O1 for formation of synthesis gas by partial oxidation and optionally partly eliminated via line 32 is obtained via line 18, a naphtha fraction is obtained via line 19, a kerosene fraction is obtained via line 20, a gas oil fraction is obtained via line 21, and a heavy liquid fraction, which is at least partly recycled in isomerizing hydrocracking zone R6 and of which the other part can be eliminated via line 33, is obtained via line 17.

Calculation and simulation software developed by the Simci Company and marketed under reference PRO II has been used to obtain material balances provided in the example below and described in connection with FIG. 2.

EXAMPLE 1

172 t/h of crude natural gas, available under a pressure of 4.1 MPa and containing 79% by volume of methane, 6% by volume of $CO_2$, 4% by volume of $H_2S$, 1% by volume of nitrogen and 10% by volume of hydrocarbons $C_2^+$, (flow 1), is sweetened with amine $T_1$ in an absorption unit. This unit uses monoethanolamine at 15% by weight in water as a solvent. The $H_2S$ content of the sweetened gas that emerges from the washing column (139 t/h, flow 2) is decreased to 40 ppb in a finishing column with zinc oxide. 85 t/h of sweetened gas (flow 3) supplies partial oxidation unit $O_1$. Oxygen (164 t/h) is provided by an air distillation unit (flow 36). The partial oxidation reactor operates under 4 MPa and at 1300° C.

54 t/h of sweetened gas (flow 4) and 152 t/h of steam (flow 38) supply steam reforming unit $R_3$. The steam reforming furnace operates under 4 MPa and at 850° C.

The recovery of heat in the effluents of partial oxidation and steam reforming makes it possible to generate HP (high pressure) vapor, which drives a turboalternator that produces the electricity that is needed for the operation of the complex.

The 317 t/h of synthesis gas that is produced by the partial oxidation unit (ratio of $H_2/CO=1.7$; flow 5) and 109 t/h of synthesis gas that is produced by the steam reforming (ratio of H2/CO=5.1; flow 8) supply the Fischer-Tropsch unit (ratio of $H_2/CO=2.16$; flow 7). The Fischer-Tropsch synthesis reactor operates under 3 MPa and at 225° C.

Fischer-Tropsch unit R1 produces 156 t/h of gas effluent (flow 23), 103 t/h of liquid hydrocarbons (at 225° C., flow 11) and 167 t/h of water (flow 37) which are treated by a suitable pollution control unit.

The energy that is produced by the Fischer-Tropsch unit is used to generate MP (mean pressure) vapor, which drives a turboalternator that produces electricity and that, in the same way as the electricity that is produced with the HP vapor, takes part in the electrical supply of the complex.

The gas effluent (flow 23) contains almost only unreacted hydrogen and CO, $CO_2$ nitrogen and hydrocarbons $C_{10}^-$. The $CO_2$ (flow 25) has been removed from the largest portion of this effluent by a decarbonation unit $R_2$ that operates at 55° C. and under 2.8 MPa. The decarbonated effluent (flow 22) is recompressed and recycled at the inlet of the partial oxidation unit.

The liquid hydrocarbons that are obtained from the Fischer-Tropsch synthesis (flow 11) are prefractionated in a gas fraction of 6 t/h (flow 15) and stabilized waxes (98 t/h, flow 13) that supply isomerizing hydrocracking unit $R_6$ (flow 14) after mixing with hydrogen (flow 12).

The hydrogen that is needed for the isomerizing hydrocracking comes from the conversion of a small portion of synthesis gas that is obtained from steam reforming (8 t/h; flow 9) with excess steam that has not reacted in the steam reforming section and that is present in flow 9. It is therefore not necessary to add additional steam via line 39. Conversion unit $R_4$ provides 5 t/h of a flow (no. 10) that contains 71% by volume of hydrogen. This crude hydrogen is purified by an adsorption unit $R_5$ that provides 1 t/h of hydrogen at a 99% volume (flow 12). This amount of hydrogen is sufficient to supply isomerizing hydrocracking zone R6. Line 35 makes it possible to evacuate a gas fraction that contains the desorbed carbon dioxide.

Production of the 123 t/h of hydroisomerizate (flow 16) supplies atmospheric distillation unit $D_2$ which also receives the stabilization head of prefractionation $D_1$, (flow 15).

The atmospheric distillation unit produces 4 t/h of gas distillate (flow 18) that basically contains $C_4^-$, which are recycled after recompression in the partial oxidation unit, a naphtha fraction of 16 t/h (flow 19), a kerosene fraction of 28 t/h (flow 20), a gas oil fraction of 56 t/h (flow 21) and an atmospheric residue of 24 t/h (flow 17), which is recycled until used up to the isomerizing hydrocracking unit.

Overall, 100 t/h (800,000 t/year) of atmospheric distillates (naphtha+kerosene+gas oil) is produced from 172 t/h (1.5 billion Nm3/year) of crude natural gas.

It is also necessary to use 41 t/h of combustible gas to supply the furnaces of the complex. Whereby 20 t/h of combustible gas can be provided by the complex itself (light fraction that is obtained from the Fischer-Tropsch section and waste gas from the hydrogen purification unit), it is therefore necessary to add a consumption of 21 t/h (180 million of Nm3/year) of natural gas to the procedural consumption of the complex. preceding examples can be repeated with similar success by substituting the generically or specifically described reactants and/or operating conditions of this invention for those used in the preceding examples. Also, the preceding specific embodiments are to be construed as merely illustrative, and not limitative of the remainder of the disclosure in any way whatsoever.

The entire disclosure of all applications, patents and publications, cited above and below, and of corresponding French application 99/01676, are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for the production of atmospheric distillate from a hydrocarbon feedstock, comprising the following stages:

a) a formation stage of a gas mixture that contains hydrogen and carbon monoxide in a ratio of about 1.7:1 to about 2.5:1, from said hydrocarbon feedstock, b) an at least partial conversion stage of the gas mixture that is obtained in stage a) at high temperature and pressure in the presence of a catalyst to obtain a liquid effluent that contains hydrocarbons that have at least 5 carbon atoms in their molecule and a gas effluent that contains the unconverted fraction of the gas mixture of stage a) and that contains carbon dioxide, c) a stage for treating the gas fraction that is obtained in stage b) so as to eliminate the carbon dioxide at least partly and to obtain a gas fraction that is low in carbon dioxide, d) a first fractionation stage of the liquid fraction that contains hydrocarbons and that is obtained from stage b) in which a heavy fraction FL1 that substantially contains hydrocarbons that have at least seven carbon atoms in their molecule and a light fraction FL2 that substantially contains hydrocarbons that have at most six carbon atoms in their molecule are separated, e) an isomerizing hydrocracking stage in which in the presence of a catalyst, at high temperature and pressure, and in the presence of hydrogen, heavy fraction FL1 that is obtained from stage d) is transformed into a fraction F2 that contains a larger amount of branched compounds than fraction FL1, f) a second fractionation stage, to which light fraction FL2 that is obtained from stage d) and fraction F2 that is obtained from stage e) are sent, and from which are separated a fraction that contains substantially hydrocarbons that have at most 4 carbon atoms in their molecule from final boiling point to atmospheric pressure that is lower than about 37° C., a fraction that has a final boiling point at an atmospheric pressure that is greater than about 300° C., and at least one intermediate atmospheric distillate fraction that has a boiling point of between about 5° C. and about 370° C.

2. The process according to claim 1, wherein stage a) for the formation of a gas mixture that contains hydrogen and carbon monoxide comprises a stage a1) for catalytic steam reforming of a portion of the hydrocarbon feedstock at high temperature and pressure under formation conditions of a substantially gaseous effluent that contains hydrogen and carbon monoxide in a ratio that is greater than or equal to 2.3:1, a partial oxidation stage a2) of another portion of the hydrocarbon feedstock under formation conditions of a substantially gaseous effluent that contains hydrogen and carbon monoxide in a ratio that is less than or equal to 2:1 and a stage a3) in which at least a portion of the substantially gaseous effluent that is obtained in stage a1) is mixed with at least a portion of the substantially gaseous effluent that is obtained in stage a2) so as to obtain a substantially gaseous mixture that contains hydrogen and carbon monoxide, whereby the amounts of feedstock treated in each of these stages a1) and a2) and those that are used to form this mixture are adjusted so that the ratio of hydrogen to carbon monoxide in the mixture that is obtained is about 1.7:1 to about 2.5:1.

3. The process according to claim 1, wherein stage a) for the formation of a gas mixture that contains hydrogen and carbon monoxide comprises a stage a1) for catalytic steam reforming, at least one portion of the hydrocarbon feedstock, at high temperature and pressure under formation conditions of a substantially gaseous effluent that contains hydrogen and carbon monoxide in a ratio that is greater than or equal to 2.3:1, a stage a2) for partial oxidation of at least a portion of the substantially gaseous mixture that is obtained from stage a1) and that contains at least one unconverted compound during stage a1) under formation conditions of a substantially gaseous mixture that contains hydrogen and carbon monoxide in a ratio of about 1.7:1 to about 2.5:1.

4. The process according to claim 1, wherein stage a) for the formation of a gas mixture that contains hydrogen and carbon monoxide comprises a partial oxidation stage a1) of at least a portion of the hydrocarbon feedstock, at high temperature and pressure under formation conditions of a substantially gaseous effluent that contains hydrogen and carbon monoxide in a ratio that is less than or equal to 2.2:1, a catalytic steam reforming stage a2) of at least a portion of the substantially gaseous mixture that is obtained from stage a1) and that contains at least one unconverted compound during stage a1) under formation conditions of a substantially gaseous mixture that contains hydrogen and carbon monoxide in a ratio of about 1.7:1 to about 2.5:1.

5. Process according to claim 1, wherein the hydrocarbon feedstock is a feedstock that contains at least one hydrocarbon compound that has less than four carbon atoms in its molecule.

6. The process according to claim 1, wherein the hydrocarbon feedstock is selected from the group that is formed by a naphtha, methane and natural gas previously treated under conditions to eliminate the majority of the carbon dioxide and hydrogen sulfide that it contains.

7. The process according to claim 6, wherein the feedstock is of the natural gas that was previously treated by a solution of at least one amine under conditions that allow the elimination of the majority of the carbon dioxide and the hydrogen sulfide that are present in said gas by absorption, whereby said amine is selected from the group that is formed by monoethanolamine, diethanolamine, diglycolamine, diisopropylamine, and methyldiethanolamine.

8. The process according to claim 1, wherein a portion of the substantially gaseous effluent that is obtained from stage a) and/or stage a1) and/or stage a2) for the formation of a gaseous mixture that contains carbon monoxide and hydrogen is sent into a conversion zone in which a hydrogen-enriched gaseous mixture is formed.

9. The process according to claim 8, wherein the conversion zone comprises at least one reactor in which in the presence of steam, the carbon monoxide that is contained in the effluent that is obtained from stage a) and/or stage a1) and/or stage a2) is transformed into carbon dioxide and hydrogen and wherein the majority of the carbon dioxide is eliminated with an absorption unit whose absorbent is regenerated periodically.

10. The process according to claim 8, wherein the hydrogen-enriched gas mixture that is obtained is sent to isomerizing hydrocracking stage e).

11. The process according to claim 1, wherein the gas fraction that is low in carbon dioxide and that is obtained in stage c) is at least partly recycled in stage a) and/or, after the methane that is contained in this fraction is separated, in stage b).

12. The process according to claim 1, wherein the fraction that substantially contains hydrocarbons that have at most 4 carbon atoms in their molecule of final boiling point at an atmospheric pressure that is less than about 37° C. that is obtained in stage f) is at least partly recycled in stage a) and/or in stage a1) and/or in stage a2).

13. The process according to claim 1, in which the fraction that has a final boiling point at atmospheric pressure that is greater than about 300° C. that is obtained in stage f) is at least partly recycled in isomerizing hydrocracking stage e).

14. The process according to claim 1, wherein the atmospheric distillate that has a boiling point between about 5° C. and about 370° C. is sent into a fractionation zone from which a naphtha fraction is recovered, as well as a kerosene fraction and/or a gas oil fraction.

15. The process according to claim 8, wherein all or some of the water that is formed in stage b) is separated from the effluent that is obtained from this stage and, after treatment in a pollution control unit, for some or all used in a unit for conversion of the carbon monoxide via the steam, or in a steam reforming unit, or in an autothermal unit; or some or part that is used to irrigate dry zone.

16. The process according to claim 8, wherein the hydrogen-enriched gas mixture is sent to isomerizing hydrocracking stage e), wherein the gas fraction that is low in carbon dioxide and that is obtained in stage c) is at least partly recycled in stage a) and/or, after the methane that is contained in this fraction is separated, in stage b), and wherein the fraction that has a final boiling point at atmospheric pressure that is greater than about 300° C. that is obtained in stage f) is at least partly recycled in isomerizing hydrocracking stage e).

17. The process according to claim 3, wherein a portion of the substantially gaseous effluent that is obtained from stage a) and/or stage a1) and/or stage a2) for the formation of a gas mixture that contains carbon monoxide and hydrogen is sent into a conversion zone in which a hydrogen-enriched gas mixture is formed, wherein said hydrogen-enriched gas mixture is sent into isomerizing hydrocracking stage e), wherein the gas fraction that is low in carbon dioxide and that is obtained in stage c) is at least partly recycled in stage a) and/or, after the methane that is contained in this fraction is separated, in stage b), and wherein the fraction that has a final boiling point at atmospheric pressure that is greater than about 300° C. that is obtained in stage f) is at least partly recycled in isomerizing hydrocracking stage e).

* * * * *